(12) United States Patent
Nobara

(10) Patent No.: US 12,304,306 B2
(45) Date of Patent: May 20, 2025

(54) DISPLAY CONTROL DEVICE, DISPLAY CONTROL METHOD, AND RECORDING MEDIUM HAVING DISPLAY CONTROL PROGRAM RECORDED THEREON

(71) Applicant: HONDA MOTOR CO., LTD., Tokyo (JP)

(72) Inventor: Yu Nobara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 487 days.

(21) Appl. No.: 17/941,317

(22) Filed: Sep. 9, 2022

(65) Prior Publication Data

US 2023/0097199 A1    Mar. 30, 2023

(30) Foreign Application Priority Data

Sep. 29, 2021    (JP) ................ 2021-159395

(51) Int. Cl.
| | | |
|---|---|---|
| *B60K 35/00* | (2024.01) | |
| *B60K 35/10* | (2024.01) | |
| *B60K 35/29* | (2024.01) | |
| *B60K 35/81* | (2024.01) | |
| *G06F 3/0486* | (2013.01) | |
| *G06F 3/0488* | (2022.01) | |

(52) U.S. Cl.
CPC ............ *B60K 35/00* (2013.01); *G06F 3/0486* (2013.01); *G06F 3/0488* (2013.01); *B60K 35/10* (2024.01); *B60K 35/29* (2024.01); *B60K 35/81* (2024.01); *B60K 2360/11* (2024.01); *B60K 2360/1434* (2024.01); *B60K 2360/1468* (2024.01); *B60K 2360/195* (2024.01)

(58) Field of Classification Search
CPC .......... B60K 2360/11; B60K 2360/111; B60K 2360/122; B60K 2360/1434; B60K 2360/1438; B60K 2360/1468; B60K 2360/195; B60K 2360/731; B60K 35/00; B60K 35/10; B60K 35/22; B60K 35/29; B60K 35/50; B60K 35/60; B60K 35/65; B60K 35/81; G06F 2203/04803; G06F 3/04817; G06F 3/0482; G06F 3/0486; G06F 3/0488; G06F 3/04886
See application file for complete search history.

(56) References Cited

U.S. PATENT DOCUMENTS

| | | | | |
|---|---|---|---|---|
| 2015/0025718 A1* | 1/2015 | Miichi | ............... | B63B 49/00 701/21 |
| 2018/0196589 A1* | 7/2018 | Feit | ............... | G06F 3/04817 |
| 2019/0179514 A1* | 6/2019 | Van Os | ............... | G06F 3/04842 |
| 2021/0206272 A1* | 7/2021 | Tuzar | ............... | B60K 35/29 |

FOREIGN PATENT DOCUMENTS

JP    2017-219968    12/2017

* cited by examiner

*Primary Examiner* — Hong Zhou
(74) *Attorney, Agent, or Firm* — Rankin, Hill & Clark LLP

(57) ABSTRACT

A display control unit includes: a first display control unit and a second display control unit that display operation buttons in a first display area and a second display area, respectively; and a third display control unit that displays, in the second display area, a first button for instructing a moving operation of the operation buttons in the second display area and a second button for instructing a moving operation of the operation buttons between the first display area and the second display area.

7 Claims, 13 Drawing Sheets

DISPLAY CONTROL DEVICE, DISPLAY CONTROL METHOD, AND RECORDING MEDIUM HAVING DISPLAY CONTROL PROGRAM RECORDED THEREON

INCORPORATION BY REFERENCE

The present application claims priority under 35 U.S.C. § 119 to Japanese Patent Application No. 2021-159395 filed on Sep. 29, 2021. The content of the application is incorporated herein by reference in its entirety.

BACKGROUND OF THE INVENTION

Field of the Invention

The present invention relates to a display control device, a display control method, and a recording medium having a display control program recorded thereon.

Description of the Related Art

In the related art, a technique has been known in which two button arrangement areas and one touch operation area are provided on a display screen of a touch panel and a function assignment of operation buttons across the button arrangement areas is changed by an operation in the touch operation area (Japanese Patent Laid-Open No. 2017-219968).

In a display control device that controls an in-vehicle display device, a processor executes a program, and thus many operation buttons for operating various functions are displayed on the display device. Depending on the display control device, according to functions of these operation buttons, the display device simultaneously displays the operation buttons displayed by a display program that directly uses a function of an OS layer and the operation buttons displayed by a display program of an application layer that operates via a programming interface on the OS layer.

Such a display control device, for example, can be configured such that the display screen of the display device is divided into two display areas and two display programs having different execution layers display operation buttons using each of the display areas individually.

By using display areas separately according to an execution layer of the display program, for example, when the OS needs to be modified, it is sufficient to modify only the display program that directly uses the function of the OS layer while leaving the display program of the application layer as it is, whereby an increase in design man-hours can be prevented. On the other hand, when the display areas are used separately according to the execution layer, a drag-and-drop operation of the operation buttons, which is commonly performed on the display screen, is restricted within each of the display areas, whereby the drag-and-drop operation across the display areas cannot be performed and thus the user may feel uncomfortable.

As a countermeasure, it is conceivable to realize all the operation buttons including the operation buttons that directly use the functions of the OS layer with one display program, and to display all the operation buttons in one display area. However, in this case, it is necessary to modify the entire display program with the modification of the OS, and the design man-hours associated with the modification increase.

From the above circumstances, an object of the present invention is to enable the drag-and-drop operation between the plurality of display areas individually used by a plurality of display programs having different execution layers by a display that is easy for a user to understand while suppressing design man-hours.

SUMMARY OF THE INVENTION

A first aspect of the present invention provides a display control device that controls an operation of a display device arranged in a vehicle, the display control device including: a first display control unit that controls a display in a first display area of the display device to display one or more operation buttons in the first display area; a second display control unit that controls a display in a second display area of the display device to display one or more operation buttons in the second display area; and a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display control unit displays, in the second display area, a first button for the user to instruct start of the first mode operation and a second button for the user to instruct start of the second mode operation.

In the first aspect of the present invention, when the first mode operation is executed in the third display control unit, the first display control unit displays each of the operation buttons displayed in the first display area in such a manner as to indicate that each of the operation buttons is in an inoperable state.

In the first aspect of the present invention, the third display control unit arranges the first button and the second button adjacent to an edge of the second display area on a side closer to a driver's seat of the vehicle.

In the first aspect of the present invention, when the third display control unit is executing the second mode operation, the second display control unit displays an operation button, which is a candidate of the drag-and-drop operation to the first display area among the operation buttons displayed in the second display area, in a size different from the operation buttons displayed in the second display area in the first mode operation.

In the first aspect of the present invention, the drag-and-drop operation performed by the third display control unit in the second mode operation includes an operation of creating a shortcut button of the operation buttons displayed in the second display control unit in the first display area.

A second aspect of the present invention provides a display control method of controlling an operation of a display device arranged in a vehicle, the operation being executed by a computer, the display control method including: a first display step in which a first display control unit that controls a display in a first display area of the display device to display one or more operation buttons in the first display area; a second display step in which a second display control unit that controls a display in a second display area of the display device to display one or more operation buttons in the second display area; and a third display step in which a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display step includes displaying, in the second display area, a first button for the user to instruct start of the first mode operation and a second button for the user to instruct start of the second mode operation.

A third aspect of the present invention provides a non-transitory computer-readable recording medium having a display control program recorded thereon, the display control program being executed by a computer of display control device that controls an operation of a display device arranged in a vehicle, the display control program causing the computer to function as: a first display control unit that controls a display in a first display area of the display device to display one or more operation buttons in the first display area; a second display control unit that controls a display in a second display area of the display device to display one or more operation buttons in the second display area; and a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display control unit displays, in the second display area, a first button for the user to instruct start of the first mode operation and a second button for the user to instruct start of the second mode operation.

According to aspect of the present invention, it is possible to perform a drag-and-drop operation between a plurality of display areas, in which a plurality display programs having different execution layers are individually used, by a display that is easy for a user to understand while preventing design man-hours.

DETAILED DESCRIPTION OF THE PREFERRED EMBODIMENT

Hereinafter, an embodiment of the present invention will be described with reference to the drawings.

Figure 1:
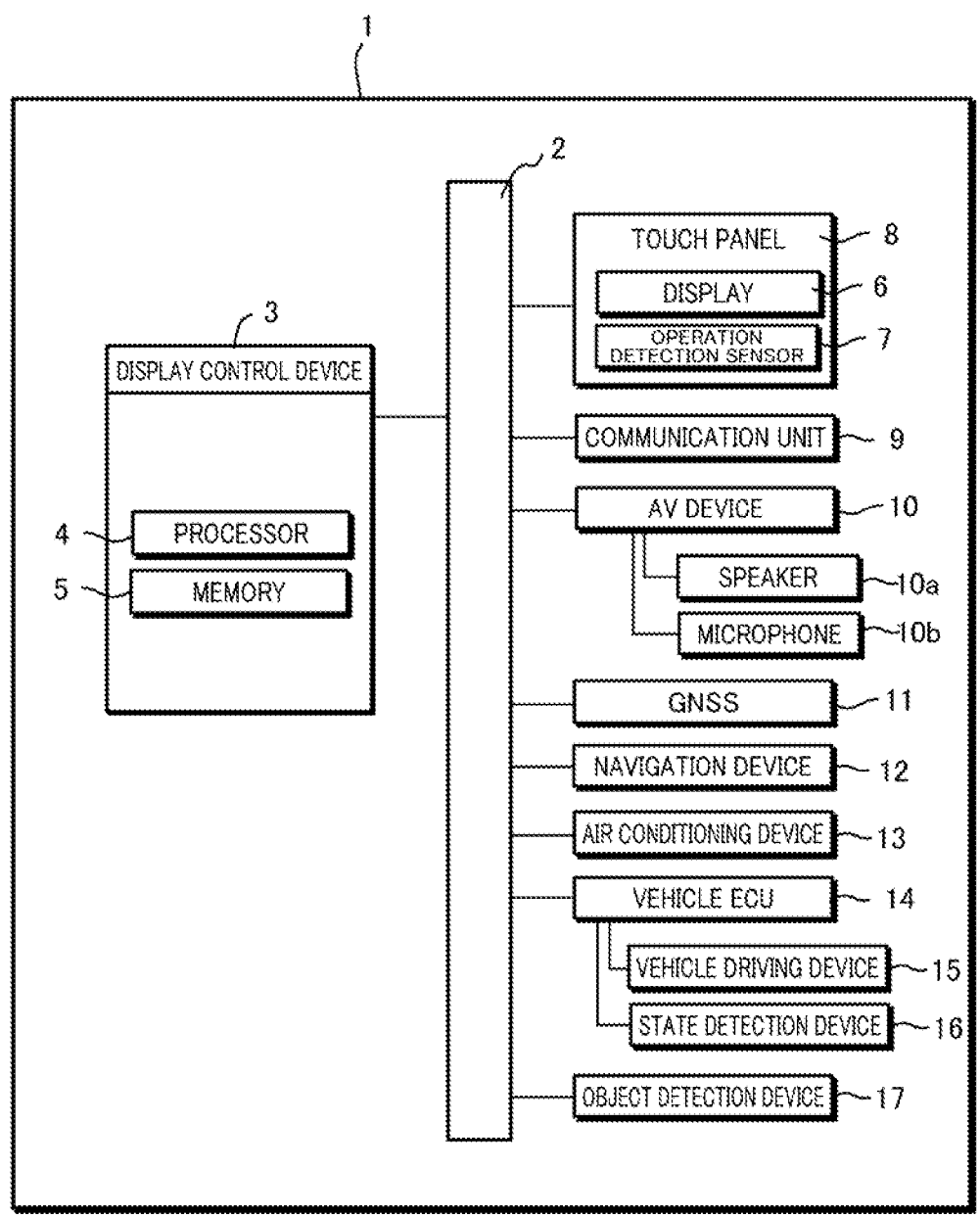
FIG. 1 is a configuration diagram of a vehicle including a display control device according to an embodiment of the present invention.

FIG. 1 is a configuration diagram of a vehicle 1 including a display control device 3 of the present embodiment.

The display control device 3 includes a processor 4 and a memory 5. The memory 5 is composed of, for example a volatile and/or non-volatile semiconductor memory and/or a hard disk device. The processor 4 is a computer included in the display control device 3, and is composed of one or a plurality of central processing units (CPUs) or micro processing units (MPUs), for example.

The display control device 3 communicates, via an in-vehicle network 2, with in-vehicle devices of the vehicle 1, for example, a touch panel 8, communication unit 9, an AV device 10 (AV: Audio Visual), a GNSS receiver 11 (GNSS: Global Navigation Satellite System), a navigation device 12, an air conditioning device 13, a vehicle ECU 14, and an object detection device 17.

The in-vehicle network 2 is not limited to a single communication network that performs communication conforming to a single communication standard, and can be composed of a plurality of communication networks that are connected to each other independently or via a gateway device to perform communication conforming to various communication standards such as CAN, Ethernet (registered trademark), and USB depending on the information quantity and/or the frequency of communication to be communicated between various in-vehicle devices described above.

The touch panel 8, which is a display device, includes a display 6 and an operation detection sensor 7. The display 6 is formed of a liquid crystal display (LCD). The operation detection sensor 7 is a touch sensor that is provided on a surface of the display 6 to detect a user's operation.

The communication unit 9 includes a wireless device conforming to a communication standard of a mobile communication system and a short-range wireless device conforming to a near-field communication standard such as Bluetooth (registered trademark).

The AV device 10 reproduces music and moving images using a display 6 and a speaker 10a of the touch panel 8 according to the related art, communicates with a mobile terminal such as a smartphone existing in the interior of the vehicle 1, and provides a hands-free call function by the speaker 10a and a microphone 10b when there is an incoming call to the mobile terminal.

The GNSS receiver 11 detects a position of the vehicle 1.

The navigation device 12 executes a route search to a destination designated by an operation of the touch panel 8, and displays a map and the position of vehicle 1 on the display 6 to perform route guidance, for example.

The air conditioning device 13 adjusts temperature and/or humidity in the interior of the vehicle 1.

The vehicle ECU 14 is an electronic control unit (ECU) that controls various operations of the vehicle 1. The vehicle 1 may include a plurality of ECUs. The vehicle ECU 14 schematically shows such a plurality of ECUs. For example, the ECU in the vehicle 1 includes an ECU that controls an operation of a vehicle driving device 15 such as a motor or an engine. Further, the ECU in the vehicle 1 includes an ECU that detects a state of the vehicle 1 (for example, a motion state such as speed, a charge state of a battery, or an operation state of an accelerator pedal and the like) based on sensor information from a state detection device 16 and outputs state information.

The state detection device 16 includes a sensor that detects a vehicle state related to a traveling operation of the vehicle 1 and a sensor that detects a state of an occupant. The sensor configured to detect the vehicle state related to the traveling operation may include a vehicle speed sensor, a steering angle sensor, an accelerator pedal sensor, a brake pedal sensor, and a voltage sensor and a current sensor provided in the battery. The sensor configured to detect the state of the occupant may include seatbelt switches, seat occupancy sensors, in-vehicle cameras.

The object detection device 17 detects an object existing around the vehicle 1 with an outside-vehicle camera, a radar, a rider, or a sonar, and outputs detection information to another in-vehicle device.

Figure 2:
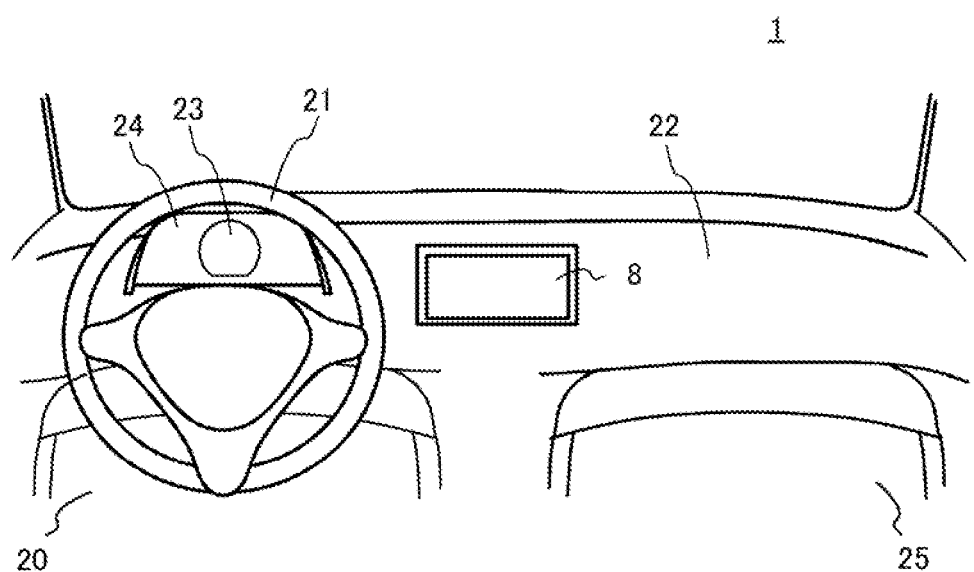
FIG. 2 is a view showing an example of an arrangement of a touch panel in a vehicle interior.

FIG. 2 is a view showing an example of an arrangement of the touch panel 8 in the interior of the vehicle 1. In the present embodiment, the vehicle 1 is a so-called left-hand drive vehicle in which a driver's seat 20 and a steering wheel 21 are on a left side in a forward advancing direction. A display panel 24 is arranged on a left side of an instrument panel 22, which can be visually recognized when a driver seated in a driver's seat 20 faces forward, to display various instruments including a speed meter 23. The touch panel 8 is arranged at a center of the instrument panel 22 in a vehicle width direction, that is, between the driver's seat 20 and a passenger seat 25.

Figure 3:
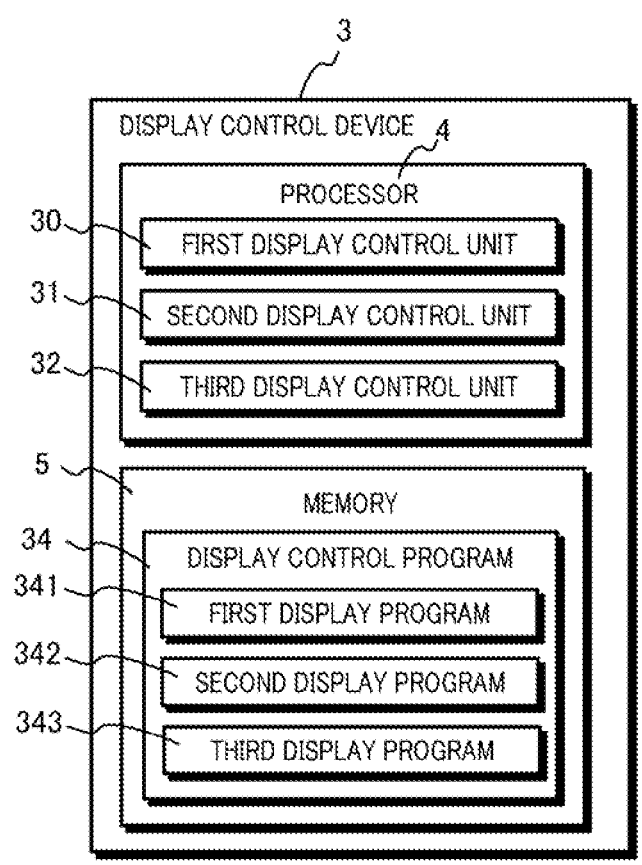
FIG. 3 is a diagram showing a configuration of the display control device.

FIG. 3 is a diagram showing a functional configuration of the display control device 3. The display control device 3 controls the operation of the touch panel 8 which is a display device arranged in the vehicle 1.

The processor 4 includes, as functional components or functional units, a first display control unit 30, a second display control unit 31, and a third display control unit 32. These functional components in the processor 4 are realized when the processor 4 as a computer executes a display control program 34 which is a computer program stored in the memory 5. The display control program 34 can be stored in any computer-readable storage medium such as an optical disk, a magnetic disk, and a flash memory.

Specifically, the display control program 34 is composed of a first display program 341, a second display program 342, and a third display program 343. The above-described functional components, for example, the first display control unit 30, the second display control unit 31, and the third display control unit 32 are realized by the first display program 341, the second display program 342, and the third display program 343 to be executed by the processor 4, respectively.

Figure 4:
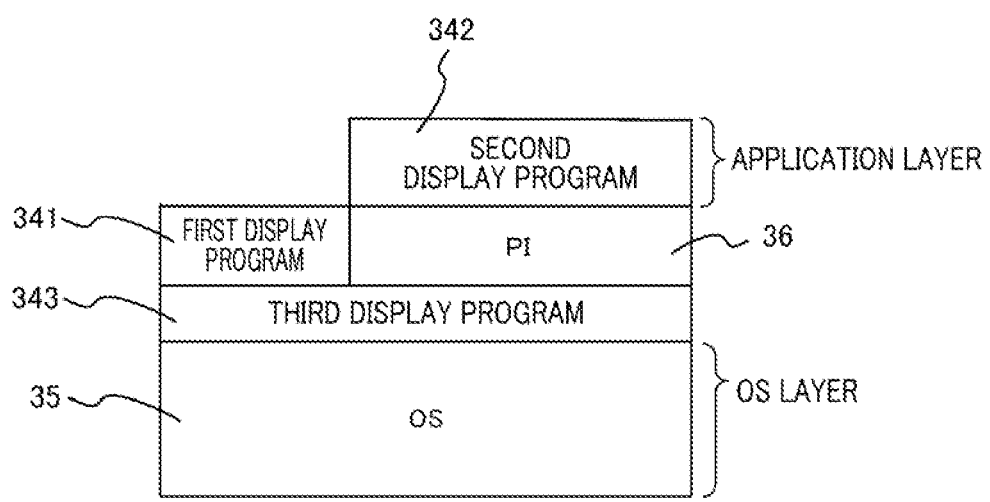
FIG. 4 is a diagram showing an example of execution layers of respective display programs constituting a display control program in a software layer.

The first display program 341, the second display program 342, and the third display program 343 are executed in different software layers, respectively. FIG. 4 is a diagram showing an example of execution layers of the respective display programs. The third display program 343 is, for example, middleware, and is executed in a layer higher one level than an OS layer in which an OS 35 (operating system) exists. The first display program 341 is a program that is on the OS layer and directly uses a function of the OS 35 in the related art. In the present embodiment, the first display program 341 is executed on the third display program 343.

The second display program 342 is executed in an application layer on a PI 36 (programming interface) that mediates the function of the OS 35.

The first display control unit 30 provides a first display area on a display screen of the touch panel 8 which is a display device, and controls the display in the first display area. The first display control unit 30 displays operation buttons in the first display area. In the present embodiment, the operation buttons displayed in the first display area by the first display control unit 30 include, for example, an starting button used at the time of start of a predetermined function and shortcut buttons for operation buttons displayed in a second display area by the second display control unit 31 as will be described below.

The second display control unit 31 provides the second display area on the display screen of the touch panel 8, and controls the display in the second display area. The second display control unit 31 displays operation buttons in the second display area. In the present embodiment, the operation buttons displayed in the second display area by the second display control unit 31 include, for example, an starting button used at the time of start of a predetermined function. The starting button may be related to the start of a function in another in-vehicle device connected to the display control device 3 via the in-vehicle network 2.

Figure 5:
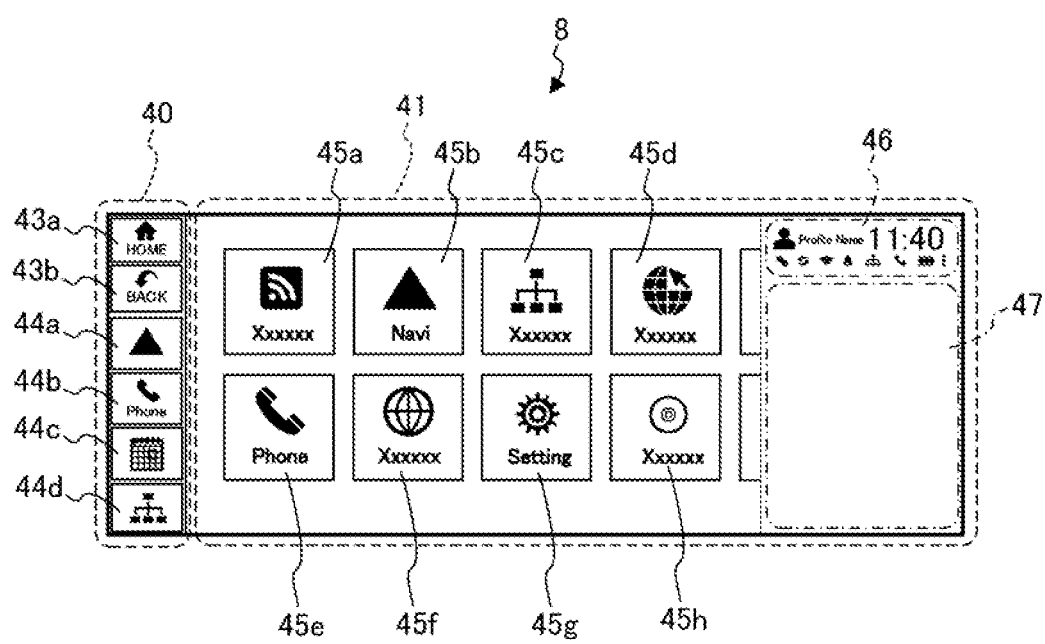
FIG. 5 is a diagram showing an example of a first display area and a second display area provided on the touch panel.

FIG. 5 shows an example of the first display area and the second display area provided on the display screen of the touch panel 8 by the first display control unit 30 and the second display control unit 31, respectively. The first display control unit 30 and the second display control unit 31 display an initial screen having a configuration shown in FIG. 5 on the touch panel 8 when the display control device 3 is powered on, for example. In the shown example, the first display area 40 is arranged along a left side of the touch panel 8, that is, a side of the driver's seat. Further, the second display area 41 is arranged on a right side of the first display area 40 to be adjacent to the first display area 40.

The second display area 41 displays a home screen as shown in FIG. 5 as an initial screen. The home screen can be displayed by the second display control unit 31 even when the first display control unit 30 detects that a home button 43a displayed in the first display area 40 is pressed.

On the home screen, eight starting buttons 45a, 45b, 45c, 45d, 45e, 45f, 45g, and 45h are displayed by the second display control unit 31. The starting buttons 45a, 45b, 45c, 45d, 45e, 45f, 45g, and 45h displayed in the second display area 41 are, for example, starting buttons used to start operating predetermined functions, respectively. Hereinafter, buttons including the starting buttons 45a, 45b, 45c, 45d, 45e, 45f, 45g, and 45h displayed on the home screen in the second display area 41 are collectively referred to as an starting button 45. For example, when the user performs a swiping operation to the left in the second display area 41, the starting button, which cannot be displayed all at once in a space of the second display area 41, is displayed in the second display area 41.

For example, the starting button 45b is an starting button that starts operating the navigation function of the navigation device 12. When the user presses the starting button 45b, the second display control unit 31 of the display control device 3 switches the display in the second display area 41 to a navigation screen including a map screen provided by the navigation device and the operation button for setting the destination. Further, for example, the starting button 45e is a phone button, and is used when a phone function of the mobile terminal (not shown) existing in the vehicle interior is used by the hands-free call function.

The second display control unit 31 may display information other than the starting button 45 in the second display are 41. In the example of FIG. 5, in the area on the right side of the second display are 41, an indicator display area 46 provided to display a time and a predetermined indicator, and an information display area 47 is provided to indicate detailed information related to the function currently being executed.

In the first display area 40, a home button 43*a* and a back button 43*b*, which are starting buttons, and shortcut buttons 44*a*, 44*b*, 44*c*, and 44*d* are displayed by the first display control unit 30. Hereinafter, shortcut buttons including the shortcut buttons 44*a*, 44*b*, 44*c*, and 44*d* displayed in the first display area 40 are collectively referred to as a shortcut button 44.

When the home button 43*a* is pressed, the first display control unit 30 notifies the second display control unit 31 of the fact. Thus, the second display control unit 31 displays the home screen in the second display area 41. The back button 43*b* is a button used to return the screen of the second display area to the immediately preceding screen. When the back button 43*b* is pressed, the first display control unit 30 notifies the second display control unit 31 of the fact. Thus, the second display control unit 31 returns the screen of the second display area 41 to the immediately preceding screen. The home button 43*a* and the back button 43*b* are common use buttons that are always maintained in an operable state.

Each of the shortcut buttons 44 is a shortcut button corresponding to any of the starting buttons 45 displayed in the second display area 41. By operating these shortcut buttons, the user can start operating the function of the starting button 45 corresponding to the shortcut button without performing a swiping operation for the second display area 41.

As described above, the first display program 341 used to realize the first display control unit 30 and the second display program 342 used to realize the second display control unit 31 are executed in different software layers. For this reason, in the home screen, the user can change the arrangement of the shortcut button 44 in the first display area 40 controlled by the first display control unit 30 and the arrangement of the starting button 45 in the second display area 41 controlled by the second display control unit 31 by a drag-and-drop operation, but the user cannot perform a drag-and-drop operation of these operation buttons between the first display area 40 and the second display area 41.

Therefore, in the present embodiment, the third display control unit 32 is provided by the third display program 343 executed as middleware, for example, and the drag-and-drop operation of the operation buttons becomes possible between the first display area 40 and the second display are 41 through the mediation of the third display control unit 32.

Specifically, the third display control unit 32 performs, in a response to a user instruction, a first mode operation of executing the drag-and-drop operation of the operation button in the second display area 41 and a second mode operation of executing the drag-and-drop operation of the operation button between the first display area 40 and the second display area 41. For this reason, the third display control unit 32 displays, in the second display area, a first button for the user to instruct start of the first mode operation and a second button for the user to instruct start of the second mode operation.

For example, the third display control unit 32 displays the first button and the second button in the second display area 41 in response to the operation of the specific starting button 45 displayed in the second display area 41.

Figure 6:
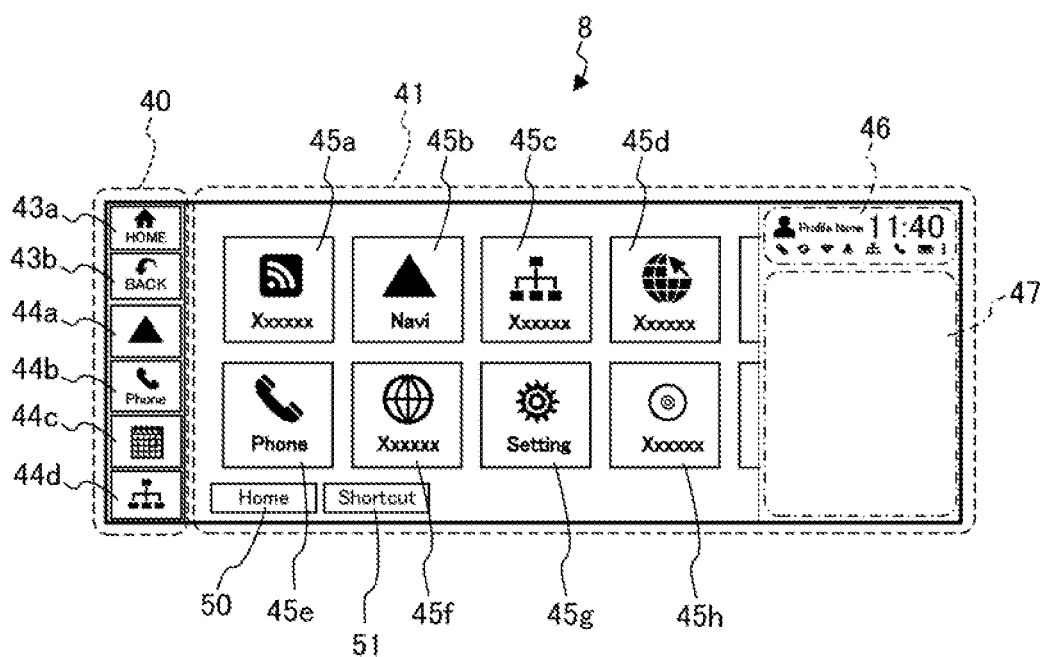
FIG. 6 is a diagram showing an example of a display screen on which a first button and a second button are displayed.

FIG. 6 shows an example of a display screen of the touch panel 8 in which the first button and the second button are additionally displayed by the third display control unit 32. In the example of FIG. 6, a first button 50 attached with a text "Home" and a second button 51 attached with a text "Shortcut" are displayed along a lower side of the touch panel 8. For example, these buttons are displayed by the third display control unit 32 when the second display control unit 31 detects a fact that the starting button 45*g* attached with a text "Setting" is long-pressed on the home screen shown in FIG. 5 and notifies the third display control unit 32 of the fact.

The first button 50 and the second button 51 are preferably provided adjacent to an edge of the second display area 41 on the side closer to the driver's seat. In the example of FIG. 6, the first button 50 and the second button 51 are arranged side by side adjacent to a left edge of the second display area 41 on which the driver's seat 20 is provided. Thus, the first button 50 and the second button 51 are improved in operability from the driver.

When the first button 50 is pressed, the third display control unit 32 executes the first mode operation. In the first mode operation, the third display control unit 32 executes a drag-and-drop operation of the starting button 45 in the second display area 41. When the user presses the first button 50 in FIG. 6, the third display control unit 32 starts executing the first mode operation, and notifies the first display control unit 30 and the second display control unit 31 of the fact.

Figure 7:
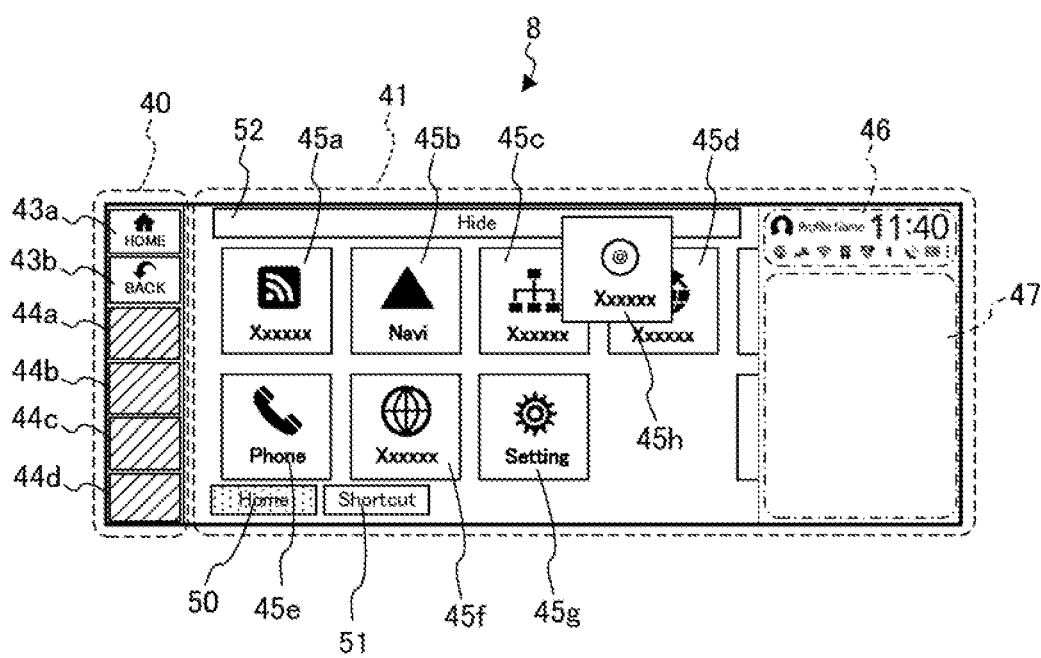
FIG. 7 is a diagram showing an example of a display screen during execution of a first mode operation.

FIG. 7 shows an example of a display screen of the touch panel 8 when the first mode operation is executed. For example, the third display control unit 32 displays the pressed first button 50 in gray out to indicate to the user that the first mode operation is being executed. The shortcut button 44 provided in the first display area 40 cannot be operated while the third display control unit 32 is executing the first mode operation. For this reason, when the first mode operation is being executed in the third display control unit 32, the first display control unit 30 displays (for example, in gray out) the shortcut button 44 displayed in the first display area 40 in a manner of indicating that the button is in an inoperable state (indicated by diagonal hatching in FIG. 7).

In the first mode operation, the third display control unit 32 displays a hide bar 52 attached with a text "Hide" along an upper side of the touch panel 8. When the user moves one of the starting buttons 45 to the hide bar 52 by the drag-and-drop operation, the third display control unit 32 instructs the second display control unit 31 to hide the starting button 45 from the second display area 41. The second display control unit 31 moves the instructed starting button 45 to a virtual area outside the second display area 41 and hides the button. The starting button 45 moved to the virtual area can be displayed in the second display area 41 by the second display control unit 31 when the user performs a swiping operation for the second display area 41. In the example of FIG. 7, the user drags and drops the starting button 45*h* to the hide bar 52.

Figure 8:
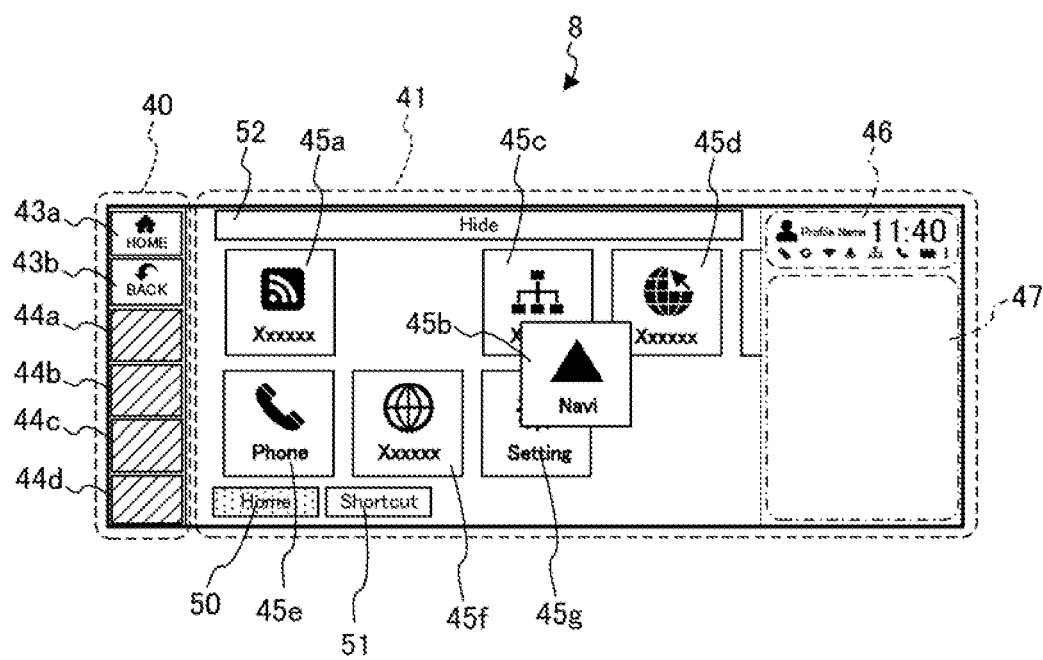
FIG. 8 is a diagram showing an example of a display screen after one starting button is hidden in the first mode operation.

Thereafter, the user can move any of the starting buttons 45 displayed in the second display area 41 to a place, where the hidden starting button 45 is located, by a drag-and-drop operation. This movement is executed by the second display control unit 31 according to the related art. FIG. 8 shows an example of a display screen of the touch panel 8 when the first mode operation is executed after the starting button 45*h* is hidden in FIG. 7. In the example of FIG. 8, the starting button 45*b* is dragged and dropped toward the place where the starting button 45*h* is located.

On the other hand, when the second button 51 displayed in the second display area 41 is pressed, the third display control unit 32 executes the second mode operation. When the third display control unit 32 starts executing the second mode operation, the third display control unit 32 notifies the first display control unit 30 and the second display control unit 31 of the fact.

In the present embodiment, when the user drags and drops the starting button 45 displayed in the second display area 41 to the first display area 40 in the second mode operation, the third display control unit 32 creates the shortcut button 44 of the starting button 45 in the first display area 40 in response to the operation of the user. Further, when the user drags and drops the shortcut button 44 displayed in the first display area 40 to the second display area 41, the third display control unit 32 erases the shortcut button 44 from the first display area 40 in response to the operation of the user.

Figure 9:
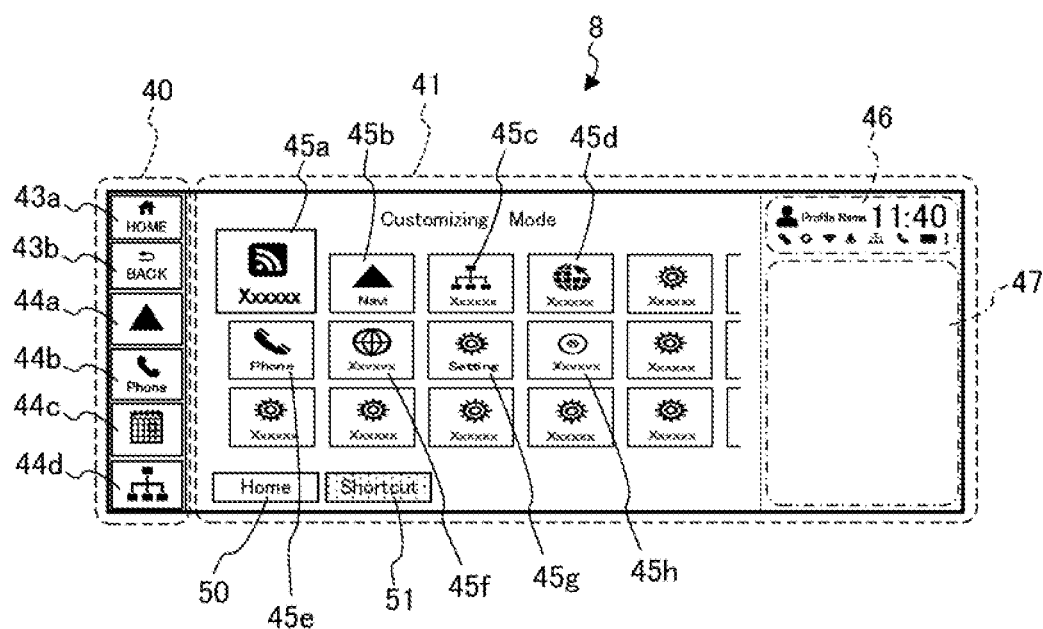
FIG. 9 is a diagram showing an example of a display screen during execution of a second mode operation.

FIG. 9 shows an example of a display screen of the touch panel 8 when the second mode operation is executed. For example, the third display control unit 32 displays the second button 51 in gray out, displays a text of "Customizing Mode" on an upper side of the touch panel 8, and informs the user that the second mode operation is being executed.

The second display control unit 31 displays the starting button 45, which is a candidate of the drag-and-drop operation to the first display area 40 among the starting buttons 45 displayed in the second display area 41 in the second mode operation, in a size different from that of the starting button 45 displayed in the second display area 41 in the first mode operation.

In the example of FIG. 9, the starting button 45a, which is not a creation candidate for the shortcut button, is displayed in the same size as the display size during the first mode operation, and the other starting buttons 45, which are the creation candidate for the shortcut button, are displayed in a size smaller than the display size during the first mode operation. It should be understood that rectangles drawn alongside the starting button 45 but not denoted by reference numerals in FIG. 9 are also the starting button 45 displayed in the second display area 41. The same applies to FIGS. 10, 11, and 12.

In the display screen as shown in FIG. 9 during the second mode operation, when the user starts a drag-and-drop operation for any of the starting buttons 45, which are creation candidates for the shortcut button, from the second display area 41 to the first display area 40, the third display control unit 32 performs a display on the touch panel 8 according to the drag-and-drop operation. Further, when the drag-and-drop operation is completed while the starting button 45 is dragged onto the first display area 40, the third display control unit 32 instructs the first display control unit 30 to generate the shortcut button 44 of the starting button 45 at a position where the starting button 45 is drooped. According to the instruction, the first display control unit 30 generates the shortcut button 44 and displays it in the first display area 40.

Figure 10:
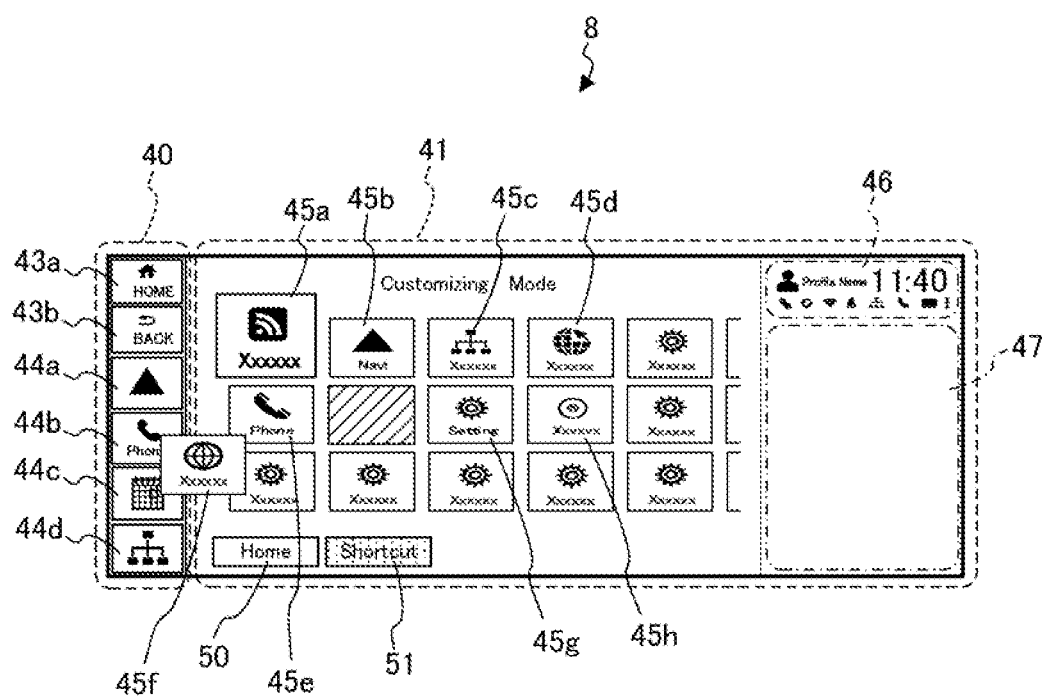
FIG. 10 is a diagram showing an example of a drag-and-drop operation from the second display area to the first display area in the second mode operation.

FIG. 10 shows an example of a drag-and-drop operation from the second display area to the first display area in the second mode operation. In FIG. 10, the starting button 45f, which is a creation candidate for the shortcut button, is subjected to a drag-and-drop operation from the second display area 41 toward the first display area 40. During this operation, the second display control unit 31 displays the starting button 45f in gray out at the original position of the starting button 45f, which is subjected to the drag-and-drop operation, in response to the instruction from the third display control unit 32.

Figure 11:
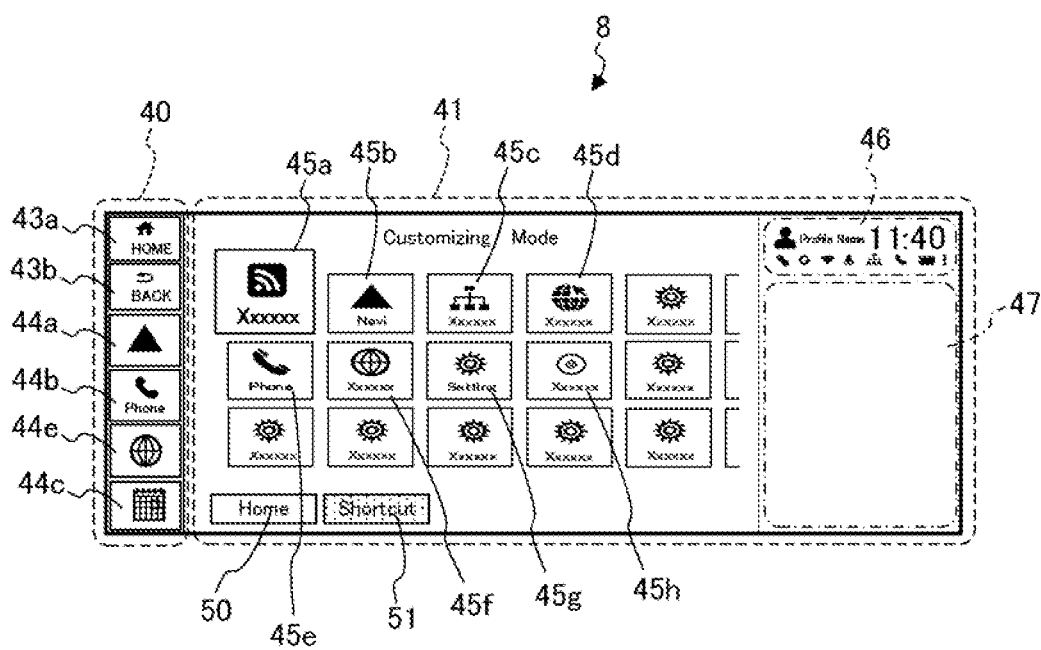
FIG. 11 is a diagram showing an example of a display screen after the starting button is subjected to a drag-and-drop operation to the first display area in the second mode operation.

FIG. 11 shows an example of a display screen of the touch panel 8 after the starting button 45 is dragged and dropped onto the first display area. In FIG. 11, a shortcut button 44e corresponding to the starting button 45f in the first display area 40 is created in response to the starting button 45f being dropped in the first display area 40 in the drag-and-drop operation described above.

Figure 12:
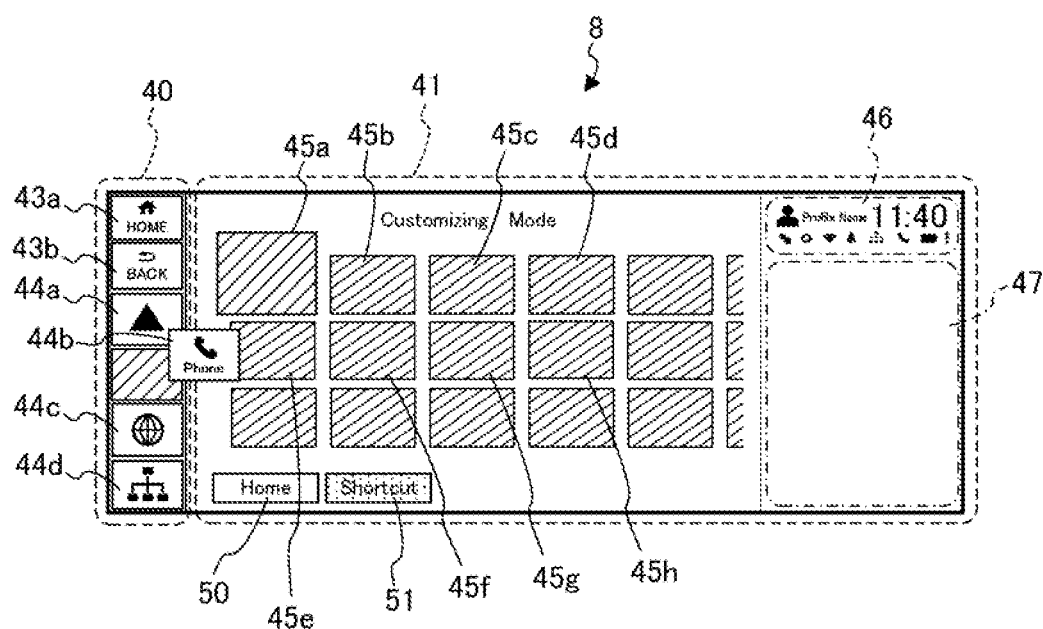
FIG. 12 is a diagram showing an example of a display screen of a drag-and-drop operation from the first display area to the second display area in the second mode operation.

FIG. 12 shows an example of a display screen for a drag-and-drop operation from the first display area to the second display area in the second mode operation. In the example of FIG. 12, a shortcut button 44b in the first display area 40 is subjected to a drag-and-drop operation toward the second display area 41. During this operation, the third display control unit 32 instructs the second display control unit 31 to display all of the starting buttons 45 displayed in the second display area 41 in gray out, for example. When the shortcut button 44b is dropped on the second display area 41, the shortcut button 44b is deleted from the first display area 40 by the first display control unit 30 in response to the instruction from the third display control unit 32.

In the display control device 3 having the above configuration, even when the first display control unit 30 and the second display control unit 31 are realized in different software layers, the user can instruct the third display control unit 32 to start the drag-and-drop operation in the display area and between the display areas according to the easy-to-understand display of the first button 50 and the second button 51. Further, since the third display program 343 can be implemented as middleware to realize the third display control unit 32, for example, even when the OS 35 needs to be modified, for example, the modification of the OS 35 can be made by modification of only the third display program 343, and an increase in a design man-hours of the display control device 3 can be prevented.

In other words, in the display control device 3, the drag-and-drop operation between the plurality of display areas individually used by a plurality of display programs having different execution layers can be realized by a display that is easy for a user to understand while design man-hours is prevented.

Figure 13:
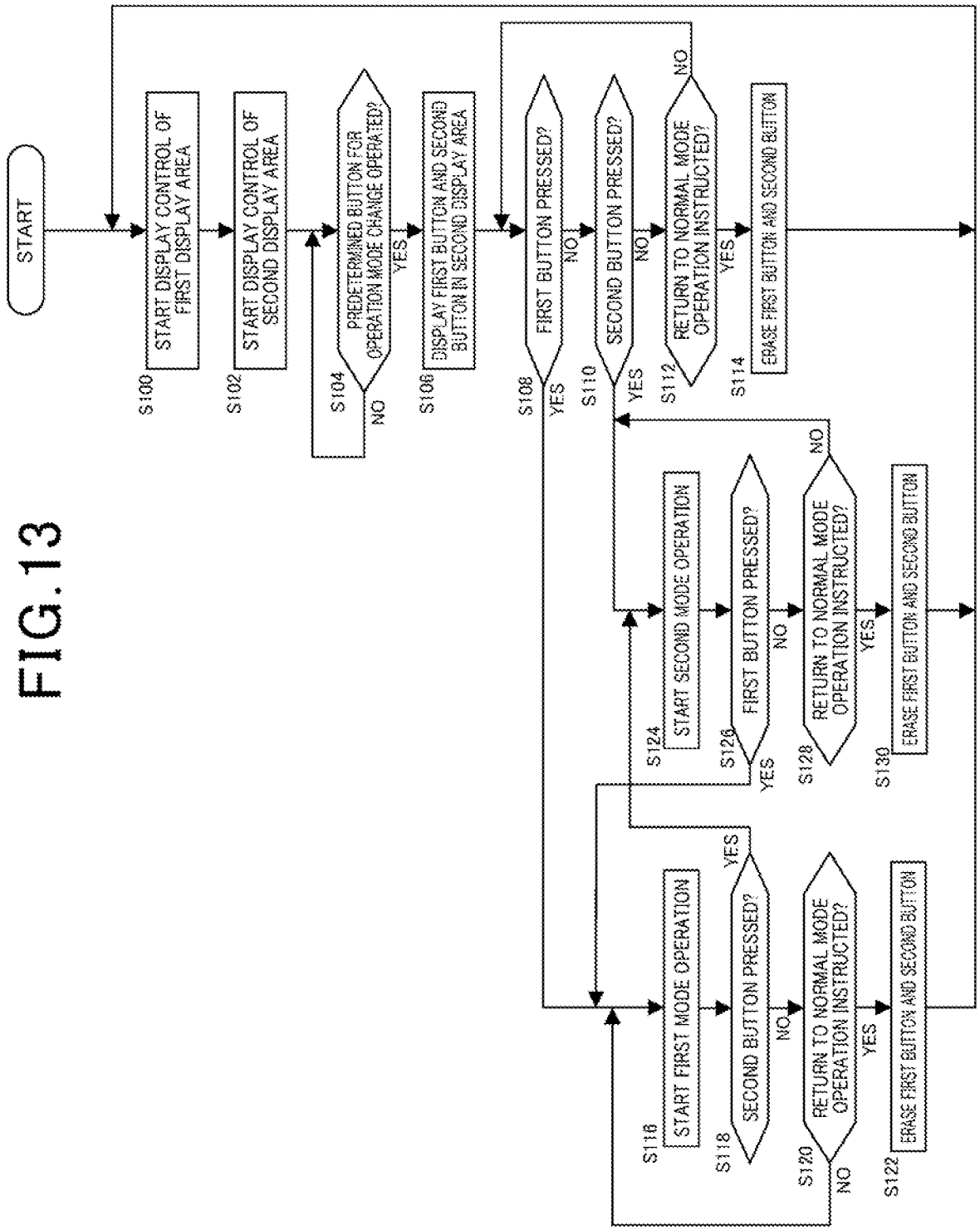
FIG. 13 is a flowchart showing an example of a procedure of an operation in the display control device.

Next, a procedure of the operation in the display control device 3 will be described. FIG. 13 is a flowchart showing an example of the procedure of the operation in the display control device 3. Processing of FIG. 13 starts and end when the display control device 3 is powered on and off, respectively.

When the processing starts, the first display control unit 30 of the display control device 3 starts the display control of the first display area 40 of the touch panel 8 which is the display device (S100), the second display control unit 31 starts the display control of the second display area 41 of the touch panel 8 (S102), and thus a normal mode operation starts executing. Here, the normal mode operation is an operation that is not accompanied by the first mode operation and the second mode operation by the third display control unit 32, and an operation in which the first display control unit 30 and the second display control unit 31 independently perform display operations in the first display area 40 and second display area 41 according to the related art. As described above, the first display control unit 30 and the second display control unit 31 display the operation buttons in the first display area 40 and the second display area 41, respectively, and execute predetermined functions for the operation buttons in response to the operation of the operation buttons from the user according to the related art.

Next, the third display control unit 32 determines whether to operate a predetermined button for an operation mode change (S104). In the example described above, the operation of the predetermined button is to long press the starting button 45g attached with the text "Setting" displayed in the second display area 41 shown in FIG. 5. However, this is only an example, and the operation of the predetermined button may be any predetermined operation for any button selected in advance from the buttons displayed in the first display area 40 and the second display area 41.

Then, when the operation of the predetermined button is not performed (NO in S104), the process returns to step S104, and the third display control unit 32 waits for the operation of the predetermined button. On the other hand, when the operation of the predetermined button is performed (YES in S104), the third display control unit 32 displays, in the second display area 41, the first button 50 for the user to instruct execution of the first mode operation and the second button 51 for the user to instruct execution of the second mode operation (S106).

Next, the third display control unit 32 determines whether the first button 50 is pressed (S108). Then, when the first button 50 is not pressed (NO in S108), the third display control unit 32 determines whether the second button 51 is pressed (S110). When the second button 51 is not pressed (NO in S110), the third display control unit 32 further determines whether the user has instructed to return to the normal mode operation (S112). The return to the normal mode operation can be instructed by the pressing of the home button 43a or the back button 43b arranged in the first display area 40 from the user, for example.

Then, when the return to the normal mode operation is not instructed (NO in S112), the process returns to step S108, and the third display control unit 32 waits for the first button 50 or the second button 51 to be pressed.

On the other hand, when the return to the normal mode operation is instructed (YES in S112), the third display control unit 32 erases the first button 50 and the second button 51 displayed in the second display area 41 (S114), and the process returns to step S100. Thus, the first display control unit 30 and the second display control unit 31 continue the normal mode operation in steps S100 and S102.

On the other hand, when the first button 50 is pressed in step S108 (YES in S108), the third display control unit 32 starts the first mode operation (S116). The third display control unit 32 executes a drag-and-drop operation of the starting button 45 in the second display area 41 in response to the user's operation. Details of the first mode operation are as described above.

Next, the third display control unit 32 determines whether the second button 51 is pressed while the first mode operation is being executed (S118). Then, when the second button 51 is not pressed (NO in S118), the third display control unit 32 determines whether the return to the normal mode operation is instructed as in step S112 (S120). Then, when the return to the normal mode operation is not instructed (NO in S120), the process returns to step S112, and the third display control unit 32 continues the first mode operation.

On the other hand, when the return to the normal mode operation is instructed (YES in S120), the third display control unit 32 erases the first button 50 and the second button 51 displayed in the second display area 41 as in step S114 (S122), and the process returns to step S100.

On the other hand, when the second button 51 is pressed in step S110 or step S118 (YES in S110 or YES in S118), the third display control unit 32 starts the second mode operation (S124). The third display control unit 32 executes a drag-and-drop operation of the shortcut button 44 and the starting button 45 between the first display area 40 and the second display area 41 in response to the user's operation. Details of the second mode operation are as described above.

Next, the third display control unit 32 determines whether the first button 50 is pressed during the execution of the second mode operation (S126). Then, when the first button 50 is not pressed (NO in S126), the third display control unit 32 determines whether the return to the normal mode operation is instructed as in step S112 (S128). Then, when the return to the normal mode operation is not instructed (NO in S128), the process returns to step S124, and the third display control unit 32 continues the second mode operation.

On the other hand, when the return to the normal mode operation is instructed (YES in S128), the third display control unit 32 erases the first button 50 and the second button 51 displayed in the second display area 41 as in step S114 (S130), and the process returns to step S100.

The present invention is not limited to the configuration of the above embodiment, and can be implemented in various aspects without departing from the gist thereof.

For example, the in-vehicle device such as the AV device 10 shown in FIG. 1 is an example, and the vehicle 1 may not include a part of the in-vehicle device shown in FIG. 1, or may be equipped with more in-vehicle devices.

Further, the functions of the in-vehicle device shown in FIG. 1 do not necessarily have to be realized as independent devices, and all or part of the functions of one device may be included in another device. For example, the display control device 3 may be realized as a part of the AV device 10 by the processor 4 and the memory 5 integrated into the processor and the memory included in the AV device 10.

The above embodiment supports the following configurations.

(Configuration 1) A display control device that controls an operation of a display device arranged in a vehicle, the display control device including: a first display control unit that controls a display in a first display area of the display device to display one or more operation buttons in the first display area; a second display control unit that controls a display in a second display area of the display device to display one or more operation buttons in the second display area; and a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display control unit displays, in the second display area, a first button for the user to instruct start of the first mode operation and a second button for the user to instruct start of the second mode operation.

According to the display control device of Configuration 1, even when the first display control unit and the second display control unit are realized in different software layers, the user can instruct the third display control unit to start the drag-and-drop operation within the display area and between the display areas according to the easy-to-understand display of the first button and the second button. Further, since the third display control unit can be implemented as a functional unit that is realized by, for example, middleware independent of the first display control unit and the second display control unit, for example, even when the OS needs to be modified, the modification of the OS can be made by modification of only the third display control unit, and an increase in a design man-hours can be prevented.

(Configuration 2) In the display control device according to Configuration 1, when the first mode operation is executed in the third display control unit, the first display control unit displays each of the operation buttons displayed in the first display area in such a manner as to indicate that each of the operation buttons is in an inoperable state.

According to the display control device of Configuration 2, in the first mode operation in which the drag-and-drop operation is performed in the second display area, the user cannot erroneously recognize that the operation buttons displayed in the first display area can also be operated.

(Configuration 3) In the display control device according to Configuration 1 or 2, the third display control unit arranges the first button and the second button adjacent to an edge of the second display area on a side closer to a driver's seat of the vehicle.

According to the display control device of Configuration 3, the first button and the second button can be improved in operability from the driver.

(Configuration 4) In the display control device according to any one of Configurations 1 to 3, when the third display control unit is executing the second mode operation, the second display control unit displays an operation button, which is a candidate of the drag-and-drop operation to the first display area among the operation buttons displayed in the second display area, in a size different from the operation buttons displayed in the second display area in the first mode operation.

According to the display control device of Configuration 4, the user can immediately recognize from the size of the starting button in the second display area whether the first mode operation is being executed or the second mode operation is being executed.

(Configuration 5) In the display control device according to any one of Configurations 1 to 4, the drag-and-drop operation performed by the third display control unit in the second mode operation includes an operation of creating a shortcut button of the operation buttons displayed in the second display control unit in the first display area.

According to the display control device of Configuration 5, it is possible to create the shortcut button of the operation buttons in the first display area managed by the first display control unit while leaving the operation buttons in the second display area managed by the second display control unit.

(Configuration 6) A display control method of controlling an operation of a display device arranged in a vehicle, the operation being executed by a computer, the display control method including: a first display step in which a first display control unit that controls a display in a first display area of the display device to display one or more operation buttons in the first display area; a second display step in which a second display control unit that controls a display in a second display area of the display device to display one or more operation buttons in the second display area; and a third display step in which a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display step includes displaying, in the second display area, a first button for the user to instruct start of the first mode operation and a second button for the user to instruct start of the second mode operation.

According to the display control method of Configuration 6, even when the first display control unit and the second display control unit are realized in different software layers, the user can instruct the third display control unit to start the drag-and-drop operation within the display area and between the display areas according to the easy-to-understand display of the first button and the second button, and even when the OS needs to be modified, the modification of the OS can be made by modification of only the third display control unit, and an increase in a design man-hours can be prevented.

(Configuration 7) A non-transitory computer-readable recording medium having a display control program recorded thereon, the display control program being executed by a computer of display control device that controls an operation of a display device arranged in a vehicle, the display control program causing the computer to function as: a first display control unit that controls a display in a first display area of the display device to display one or more operation buttons in the first display area; a second display control unit that controls a display in a second display area of the display device to display one or more operation buttons in the second display area; and a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display control unit displays, in the second display area, a first button for the user to instruct start of the first mode operation and a second button for the user to instruct start of the second mode operation.

According to the display control program recorded on the recording medium of Configuration 7, the computer of the display control device can be configured to instruct the third display control unit to start the drag-and-drop operation within the display area or between the display areas by the display that is easy for a user to understand even when the first display control unit and the second display control unit are realized in in different software layers, and to prevent design man-hours by the modification of only the third display control unit even when the OS needs to be modified.

REFERENCE SIGNS LIST 1 vehicle
2 in-vehicle network
3 display control device
4 processor
5 memory
6 display
7 operation detection sensor
8 touch panel
8a lower side
8b upper side
9 communication unit
10 AV device
10a speaker
10b microphone 11 GNSS receiver
12 navigation device
13 air conditioning device
14 vehicle ECU
15 vehicle driving device
16 state detection device
17 object detection device
20 driver's seat
21 steering wheel
22 instrument panel
23 speed meter
24 display panel
25 passenger seat
30 first display control unit
31 second display control unit
32 third display control unit
34 display control program
341 first display program
342 second display program
343 third display program
35 OS (operating system)
36 PI (programming interface)
40 first display area
41 second display area
43a home button
43b back button
44, 44a, 44b, 44c, 44d, 44e shortcut button
45, 45a, 45b, 45c, 45d, 45e, 45f, 45g, 45h starting button
46 indicator display area
47 information display area
50 first button
51 second button
52 hide bar

What is claimed is:

1. A display control device that controls an operation of a display device arranged in a vehicle, the display control device comprising:
    a first display control unit that controls a display in a first display area of the display device to display one or more operation buttons in the first display area;
    a second display control unit that controls a display in a second display area of the display device to display one or more operation buttons in the second display area; and
    a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein
    the third display control unit displays, in the second display area, a first button for the user to instruct start of the first mode operation and a second button for the user to instruct start of the second mode operation.

2. The display control device according to claim 1, wherein
    when the first mode operation is executed in the third display control unit, the first display control unit displays each of the operation buttons displayed in the first display area in such a manner as to indicate that each of the operation buttons is in an inoperable state.

3. The display control device according to claim 1, wherein
    the third display control unit arranges the first button and the second button adjacent to an edge of the second display area on a side closer to a driver's seat of the vehicle.

4. The display control device according to claim 1, wherein
    when the third display control unit is executing the second mode operation, the second display control unit displays an operation button, which is a candidate of the drag-and-drop operation to the first display area among the operation buttons displayed in the second display area, in a size different from the operation buttons displayed in the second display area in the first mode operation.

5. The display control device according to claim 1, wherein
    the drag-and-drop operation performed by the third display control unit in the second mode operation includes an operation of creating a shortcut button of the operation buttons displayed in the second display control unit in the first display area.

6. A display control method of controlling an operation of a display device arranged in a vehicle, the operation being executed by a computer, the display control method comprising:
    a first display step in which a first display control unit that controls a display in a first display area of the display device to display one or more operation buttons in the first display area;
    a second display step in which a second display control unit that controls a display in a second display area of the display device to display one or more operation buttons in the second display area; and
    a third display step in which a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein
    the third display step includes displaying, in the second display area, a first button for the user to instruct start of the first mode operation and a second button for the user to instruct start of the second mode operation.

7. A non-transitory computer-readable recording medium having a display control program recorded thereon, the display control program being executed by a computer of display control device that controls an operation of a display device arranged in a vehicle,
    the display control program causing the computer to function as:
    a first display control unit that controls a display in a first display area of the display device to display one or more operation buttons in the first display area;
    a second display control unit that controls a display in a second display area of the display device to display one or more operation buttons in the second display area; and
    a third display control unit that performs, in response to an instruction from a user, a first mode operation of executing a drag-and-drop operation of each of the operation buttons in the second display area and a second mode operation of executing a drag-and-drop operation of each of the operation buttons between the first display area and the second display area, wherein the third display control unit displays, in the second display area, a first button for the user to instruct start of the first mode operation and a second button for the user to instruct start of the second mode operation.

* * * * *